March 18, 1958     K. A. KLINGLER     2,826,919
SEALED LIQUID CONTROL
Filed Oct. 7, 1952
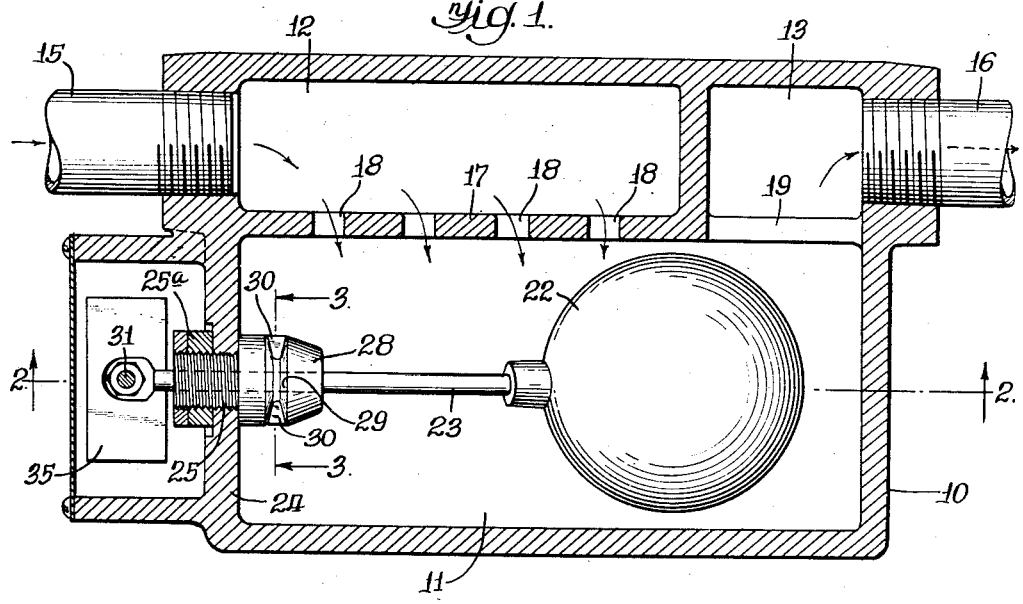
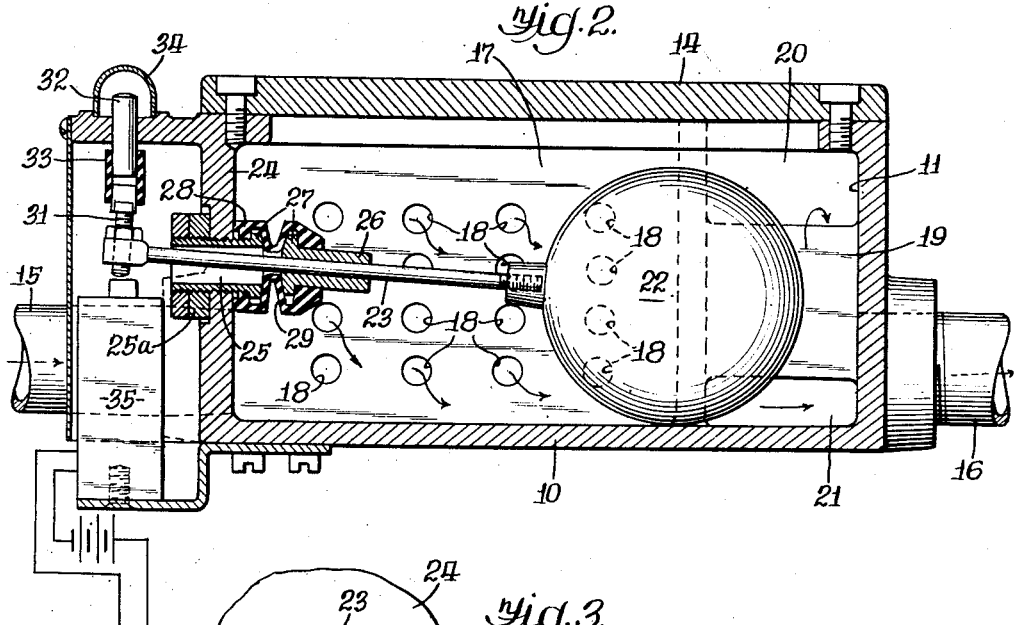
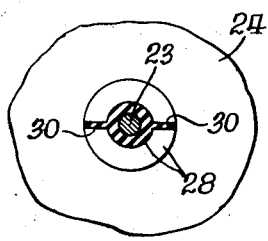
INVENTOR.
Karl A. Klingler
BY
Harvey M. Gillespie
Atty.

United States Patent Office 2,826,919
Patented Mar. 18, 1958

2,826,919

SEALED LIQUID CONTROL

Karl A. Klingler, Naperville, Ill.

Application October 7, 1952, Serial No. 313,415

3 Claims. (Cl. 74—18.1)

This invention relates to sealed liquid control adapted to control a signal device and/or other devices associated with or depending upon the volume of water flowing through said mechanism.

It is a principal object of the invention to provide structure by which the position of a float is regulated by the depth of a stream of water flowing through the mechanism, with such float arranged for operating an indicator or, if desired, for operating a control switch of a machine or device which is associated with or dependent upon a flow of a predetermined volume of water.

The mechanism of the present invention is employed preferably in connection with a compressor or other similar operating system (not shown) which requires the continuous flow of water around the compression cylinders to dissipate the heat generated during the operation of the compressor. In the event that the volume of water declines to such extent that it is insufficient to dissipate the heat generated, the mechanism of the present invention functions to stop the operation of the compressor and/or energize an electrical signal to indicate the low water condition.

While the invention is designed and will be described herein with reference to its control of an air compressor, it will be understood that the mechanism may be employed in connection with many different types of machines in connection with which it is important that the rate of flow of water through the machine is indicated by a visual or other type of signal or in connection with which it is desired that the rate of flow of water through the machine shall be relied upon for the control of the machine.

It is one of the objects of the invention to provide an improved construction by which the movements of a float in a tank shall be regulated by the depth of water in the tank, which in turn shall be regulated directly in accordance with the volume of water entering the tank as compared with the amount of water permitted to escape from the tank.

It is another object of the invention to provide an improved form of mounting means for a pivoted arm or lever to which a float is connected, whereby free movement of the arm with the float shall be permitted and a portion of the arm may extend through a wall of the tank for operating a switch or similar control element while, at the same time, leakage of water is prevented at the point where the float arm extends through the wall of the tank.

It is another object of this invention to improve devices of this type in sundry detail hereinafter pointed out. The preferred means by which the several objects have been attained are illustrated in the accompanying drawing, in which Fig. 1 is a horizontal sectional view through the preferred form of my improved mechanism;

Fig. 2 is a vertical sectional view taken substantially at the line 2—2 in Fig. 1; and Fig. 3 is a vertical sectional view taken substantially at the line 3—3 in Fig. 1.

Referring now to the several figures of the drawing, in which corresponding parts are indicated by the same reference characters, 10 indicates a tank in the form of a metal casting, having three chambers 11, 12 and 13 therein, with the top face of the tank closed by a removable plate 14. A water pipe 15 leads into the inlet chamber 12 for feeding water thereto, and a pipe 16 leads out of the outlet chamber 13. The partition 17 between the inlet chamber 12 and the intermediate chamber 11 is provided with a plurality of openings 18 therethrough arranged in four rows horizontally, sixteen of such openings being provided in the construction illustrated, the aggregate size of the sixteen openings being at least as great as the size of the inlet pipe 15. The arrangement is such that the effectiveness of the openings 18 for permitting the flow of water through the partition 17 from the chamber 12 to the intermediate chamber 11 increases as the level of the water in the chamber 11 rises, the flow capacity of the openings in the bottom three rows of such openings for the passage of water into the chamber 11 being substantially less than the flow capacity of the pipe 15 for feeding water to the chamber 12. Thus, when water is first fed to the chamber 12 at the start of an operation the level of the water in said chamber is built up gradually. When the chamber 12 has been filled substantially to the level of the top portions of the upper row of the openings 18, and for as long a time as the water remains at that level, the flow capacity is sufficient for permitting water to escape from the chamber 12 as rapidly as the water is fed to such chamber.

As is clearly shown in Fig. 2, the partition 19 between the intermediate chamber 11 and the outlet chamber 13 is imperforate but it is positioned in spaced relationship to the top and bottom walls of the tank so as to provide passageways 20 and 21 for the movement of water from the chamber 11 to the chamber 13 for escape through the outlet pipe 16. The size of the opening or passageway 21 at the bottom of the tank is somewhat smaller than the size of the inlet pipe 15, so as to insure that when the inlet pipe 15 serves for an extended period to carry a full complement of water into the intermediate chamber 11 such chamber will be gradually filled to such a level as to produce an auxiliary flow of the water through the passageway 20 at the top into the outlet chamber 13 for escape through the outlet pipe 16 and when the flow of water is insufficient to maintain a suitable level in the intermediate chamber the reduced flow condition will be indicated.

In the intermediate chamber 11, in the construction shown, a float 22 of any approved form is provided, mounted on a lever or arm 23 movably mounted in a suitable opening through the wall portion 24 at the end of such chamber 11. The opening through the wall portion 24 is below the normal water level in the tank. However, the present improvement makes it practical to extend the float level through said opening for direct operation of a signal and/or an electrical switch and at the same time prevent leakage of water through said opening. In this connection a sleeve 25 of such size as to permit the arm 23 to swing freely through a substantial angle is fitted into the opening in said wall portion 24 of the tank. In the construction illustrated, the sleeve 25 is secured in position by means of screw-threads, with a nut 25a serving to lock the sleeve in position. Adjacent to the end of the sleeve 25, there is a second sleeve 26 which is mounted tightly on the arm 23. As is clearly shown in Fig. 2, the sleeves 25 and 26 are provided at their adjacent ends with flanges or shoulders 27 upon which a connector member 28 of rubber or similar material is tightly fitted, such connector member being in the form of a sleeve which serves as a pivot member for supporting the arm 23 swingingly in position with respect to the tank structure. The sleeves 25, 26 and the connector member 28 are ordinarily assembled so that they may be installed as a unit together with the float lever, thereby simplifying the installation of the float mechanism.

The arrangement is such that when the flow of water through the tank 10 is insufficient to build up a body of water in the intermediate chamber 11 the float 22 assumes the low position, as shown in Fig. 2. When, however, water is fed into the chamber 11 in a volume greater than can be discharged through opening 21, the float is caused to rise so as to swing the arm or lever 23 upwardly for permitting free swinging of the arm. The connector member 28 is provided with a deep groove 29 thereabout to provide it with the desired flexibility. For strengthening the sleeve 28 without substantially cutting down its ability to flex vertically, webs 30 are provided across the groove 29 at opposite sides of the connector member, such webs being preferably formed integrally with the sleeve or connector.

In one preferred form of structure as shown by the drawing, the end portion of the arm 23 at the left is provided with a vertically adjustable pin 31 which is flexibly connected with an indicator member 32 mounted so as to slide vertically in a wall portion of the tank 10. In the construction illustrated, the flexible connection beween the pin 31 and the indicator member 32 is effected by the use of a short piece of rubber tube 33. As will be appreciated from an inspection of Fig. 2, when the float 22 is in its lowered position as shown, the indicator member 32 is in its uppermost position, and as the float is caused to rise by virtue of an accumulation of water in the chamber 11 the indicator member will be drawn downwardly so as to show at all times the depth of the water in the chamber 11. The indicator member 32 is preferably protected by a dome 34 of glass or plastic into which the indicator projects.

In the construction illustrated, I have provided a quick-throw electrical switch 35 of any approved type in position for operation by the pin 31. As will be readily understood, when the pin 31 reaches a predetermined point in its movement in one direction the switch 35 is given a snap movement for closing an electrical circuit, and when the pin reaches a predetermined point in its movement in the opposite direction the switch is given a snap movement for opening the circuit. The circuit controlled by the switch may of course be connected up with any appropriate electric system as may be desired, either in connection with this improved flow actuated mechanism, or otherwise.

The operation of the device as shown may be varied greatly, depending on the sort of mechanism with which it is employed. In all instances, however, the position of the float 22 is controlled by the depth of the water in the chamber 11, which in turn is controlled by the rate of flow of the water through the inlet pipe 15 and the rate of flow of the water outwardly through the pipe 16.

In the movement of the water through the tank 10 and particularly from the chamber 12 into the chamber 11, the capacity of the flow of the water into the chamber 11 is increased very substantially as the depth of the water increases in the chamber 12. When the water is at a low level in chamber 12, the water can pass through only the lower four openings 18 as distinguished from the passage of the water through all sixteen of the openings 18 when the water reaches its high level in the chamber 12.

A different pattern of control is provided for the flow of the water from the intermediate chamber 11 into the outlet chamber 13, in that the flow through the passageway 21 is unlimited at all times, whereas there is auxiliary flow through the passageway 20 only when the level of the water reaches a fairly high point in the chamber 11.

By the use of these two different patterns of control of the flow of the water together in my apparatus, I am enabled very readily to meet different requirements in connection with the operation of compressors and other mechanisms.

While the form of apparatus as shown and described is preferred, the invention is not to be limited to such structure except as the same may be claimed, it being understood that changes might well be made in the form and arrangement of the parts without departing from the invention.

I claim:

1. A device for mounting an arm for movement in a single plane only comprising a sleeve carried on the arm and having tight engagement therewith, a second sleeve having an internal diameter substantially greater than the thickness of said arm and supported in a fixed position for loosely receiving an end portion of said arm for angular tilting movements therein, the said sleeves being positioned in spaced apart axial relation and having their adjacent ends formed with radial enlargements, and a flexible connecting sleeve of rubber having internally grooved end portions for fitting over and resiliently gripping said radial enlargements of said spaced apart sleeves and the medial portion of said connecting sleeve being formed with tranversely extending diametrically opposed external grooves for rendering it readily flexible in a single plane in response to angular movements of said arm relative to said second sleeve.

2. An arm mounting device as defined in claim 1 characterized in that said connecting sleeve is formed at opposite sides thereof with transversely extending rigidifying webs located between the adjacent end portions of said opposed grooves for resisting flexing of the connecting sleeve except in said single plane.

3. A water flow actuated mechanism comprising, in combination, a float chamber adapted to contain variable quantities of water and provided with a wall formed with an opening therein, a rigid sleeve fitted in said opening and projecting inwardly of said wall, a float actuated arm extending loosely through said sleeve, a second sleeve tightly fitting a portion of said arm at a location within the float chamber and positioned in spaced apart axial relation to the first mentioned sleeve, and means for sealing said opening and for pivotally supporting said arm comprising a connecting sleeve of rubber resiliently gripping the adjacent ends of said first and second mentioned sleeves and formed with transversely extending diametrically opposed external grooves for rendering it readily flexible in a single plane in response to angular movements of said arm in response to the rise and fall of the water level in said chamber.

References Cited in the file of this patent

UNITED STATES PATENTS

| | | |
|---|---|---|
| 306,062 | Creelman | Oct. 7, 1884 |
| 326,143 | Page | Sept. 15, 1885 |
| 1,161,736 | Sayer | Nov. 23, 1915 |
| 1,167,776 | Minekime | Jan. 11, 1916 |
| 1,227,212 | Stanley | May 22, 1917 |
| 1,245,809 | Smirz | Nov. 6, 1917 |
| 1,449,655 | Church | Mar. 27, 1923 |
| 1,514,520 | Hazard et al. | Nov. 4, 1924 |
| 1,524,347 | England | Jan. 27, 1925 |
| 1,743,340 | Grant | Jan. 14, 1930 |
| 1,821,699 | Fleck | Sept. 1, 1931 |
| 2,137,880 | Loesser | Nov. 22, 1938 |
| 2,226,388 | Richter | Dec. 24, 1940 |
| 2,381,640 | Brandstrom | Aug. 7, 1945 |
| 2,514,059 | Hicks et al. | July 4, 1950 |
| 2,530,981 | Mikina | Nov. 21, 1950 |
| 2,608,207 | Levan | Aug. 26, 1952 |
| 2,617,306 | Knudsen | Nov. 11, 1952 |
| 2,642,747 | Levan | June 23, 1953 |